Figure 1:
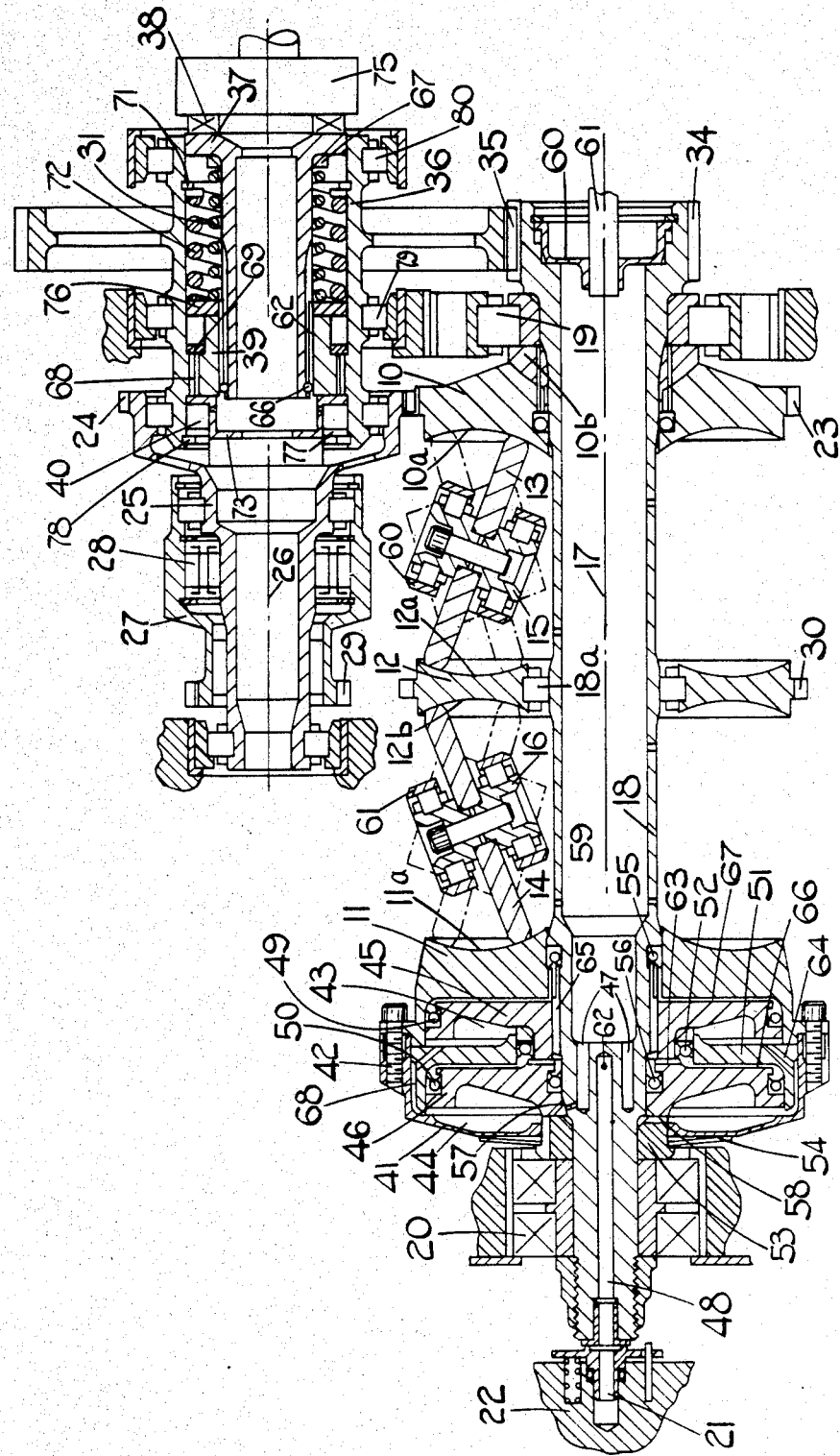

United States Patent [19]

Sharpe et al.

[11] Patent Number: 4,537,578
[45] Date of Patent: Aug. 27, 1985

[54] COUPLINGS

[75] Inventors: Raymond Sharpe, Mirfield; Trevor J. Griffiths, Bradford; Peter Hunt, Shipley, all of England

[73] Assignee: Lucas Industries Limited, England

[21] Appl. No.: 109,225

[22] Filed: Jan. 3, 1980

Related U.S. Application Data

[63] Continuation-in-part of Ser. No. 824,248, Aug. 12, 1977, abandoned.

[51] Int. Cl.³ .............................................. F16D 11/00
[52] U.S. Cl. ..................................... 464/31; 192/82 T
[58] Field of Search ................... 64/28 R, 30 C, 30 D; 192/82 T; 464/31

[56] References Cited

U.S. PATENT DOCUMENTS

| | | | |
|---|---|---|---|
| 2,314,227 | 3/1943 | Lieberherr | 64/30 C |
| 2,539,534 | 1/1951 | Eckhardt | 64/28 R |
| 3,212,613 | 10/1965 | Carlson | 192/82 T |
| 3,675,444 | 7/1972 | Whipple | 64/28 R |
| 3,889,789 | 6/1975 | Boehringer | 64/28 R |
| 4,086,991 | 5/1978 | Swadley | 64/28 R |
| 4,271,947 | 6/1981 | Gaeckle | 64/28 R |

Primary Examiner—Magdalen Y. C. Moy
Attorney, Agent, or Firm—Kane, Dalsimer, Kane, Sullivan and Kurucz

[57] ABSTRACT

A coupling for use in a transmission system and between coaxial rotary members which are arranged for driving engagement through axially engaging teeth thereon, one of said members being connected, directly or indirectly by helical splines to a further part such that in normal rotation, the said one member has a force exerted upon it tending to separate the teeth, such force being resisted by a fusible element which will melt when temperature rises above a predetermined value, melting of said element permitting axial movement of said one member relatively to said further part, through the splines to permit disengagement of the teeth, bearings supporting said further part, being substantially free from axial loading and spring means being provided for preventing re-engagement of the teeth after the element has melted.

7 Claims, 2 Drawing Figures

COUPLINGS

This application is a continuation-in-part of Ser. No. 824,248 filed Aug. 12, 1977 and now abandoned.

This invention relates to couplings for coaxial rotary members permitting drive to take place in one direction but allowing the members to rotate relatively to one another in the opposite direction, without engagement between them and without interference, in the event of malfunctioning.

One example of a coupling of the kind with which the invention is concerned is in a variable ratio frictional drive gear of the kind comprising basically two axially spaced torus discs or rotors, one serving as an input and the other an output between which there is a set of circumferentially spaced drive rollers in frictional rolling contact with part toroidal surfaces on the discs, each roller being rotatably mounted in a bearing structure which can tilt about an axis at right angles to the axis of rotation of each roller so as to vary the distances from the gear axis at which the roller engages the two discs respectively, thus varying the drive ratio of the gear. The angle of tilt of the roller bearing structure as it controls the drive ratio of the gear, is called the ratio angle. The input however is protected by a coupling designed to permit rotation between the input and a member by which it is normally driven, the coupling being arranged to permit such rotation in the event of malfunctioning.

This is of particular use when the system is run at very high rotational speeds, perhaps up to 20,000 revolutions per minute. Since such a system runs at high speed and operating conditions are therefore arduous, it is desirable to provide some protection against malfunctioning.

It is therefore an object of the invention to provide a coupling between the coaxial rotary members in which protection against malfunctioning, leading to excessive temperature rise, is afforded in an effective form.

It is a further object to provide such a coupling in which the members are drivingly interconnected by meshing teeth, there being provision for disconnection of the teeth when excessive temperature conditions occur and one of the members being supported in a bearing which is, in use, substantially free from axial loading.

Figure 2:
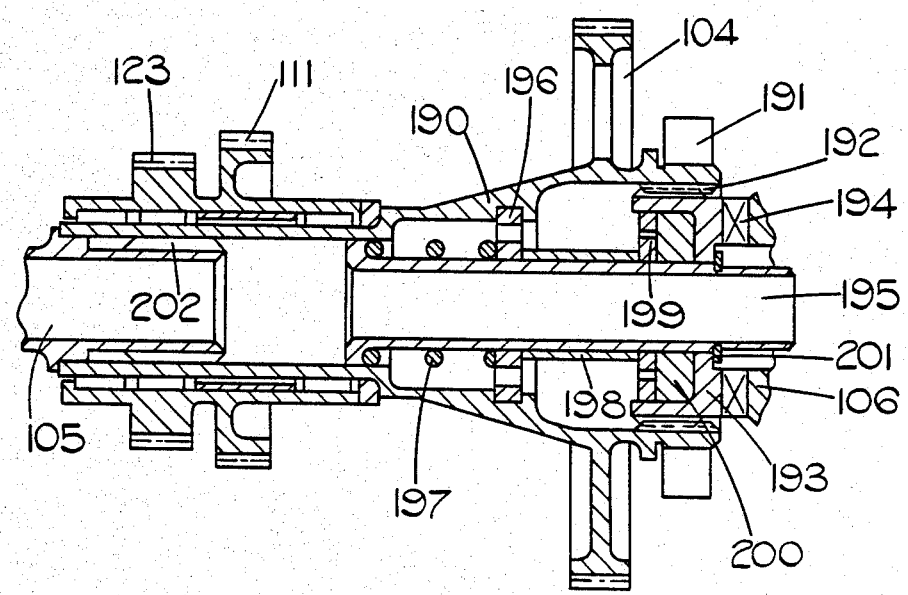

The invention will now be described, by way of example, with reference to the accompanying drawings, in which:

FIG. 1 is a cross-sectional view showing a transmission system incorporating the invention, and FIG. 2 is a view of an alternative form of coupling.

The transmission system shown in FIG. 1 is principally designed for use in driving aircraft accessories and in particular an alternator. The alternator is driven from an aircraft main engine but is required to be rotated at constant speed. The transmission is therefore designed for variable input speed, but constant output speed. It is, however, to be understood that a coupling as herein defined can be used in transmissions of this sort with other operating characteristics including constant input and variable output speed and variable input as well as variable output speeds. It is also to be understood that direction of rotation may be immaterial.

Referring first to FIG. 1, the general layout of the transmission is illustrated. The system includes a variable ratio drive unit having three rotors 10, 11, 12 which have respective axially presented part toroidal surfaces 10a, 11a and 12a and 12b respectively. The rotor 12, is situated midway between the rotors 10 and 11, and is provided with its part toroidal surfaces 12a, 12b on opposite axially presented sides thereof. The rotor 10 has its part toroidal surface 10a presented towards the surface 12a, and similarly the surface 11a of the rotor 11 is presented towards the surface 12b of the central rotor 12. The outside two rotors 10, 11 are input rotors and the central rotor 12 is an output rotor. However, the system will operate perfectly satisfactorily with the rotors 10, 11 as output and the rotor 12 as the input. Situated between the rotors 10, 12 and 11, 12 are respective sets of flat rollers 13, 14. These are rotatable and are for this purpose carried in respective bearings 15, 16. The rollers are shown in FIG. 1 in position in which they engage the respective surfaces 10a, 12a and 11a, 12b at different distances from the axis of rotation of the rotors 10, 11, 12. Such axis is identified at 17. The rotors 10, 11 are carried non-rotatably upon a hollow shaft 18. This is supported on suitable fixed structure 22 by means of bearings 19, 20 situated near its opposite ends respectively.

To load the rotors 10, 11, 12 and the rollers 13, 14 so as to maintain frictional contact between them, there is and end load device within a housing 41 secured by screws 42 to the rotor 11 at the side thereof remote from its part toroidal surface 11a.

Defined within the space between the rotor 11 and the housing 41 are cavities 43, 44 for hydraulic fluid. Within the cavities are respective pistons 45, 46 mounted on the shaft 18. In the end of the shaft 18 is a rotary fluid joint 21 engaged in the fixed structure 22.

Furthermore, in this end of the shaft 18 are drillings 47, 48 for supply and exhaust of fluid to the cavities 43, 44. The passage 48 communicates with the joint 21 for supplying high pressure fluid fed at one side of each of the pistons 45 and 46. At the other side of the pistons 45 and 46, lower fluid pressure is fed from one of the two drillings 47 which are symmetrical for balance of the shaft.

In operation of this transmission system, with variable speed input and constant output, there is automatic compensation for input speed change and this is achieved through the alteration in the castor angle of the rollers. The inclination of the rollers as seen in FIG. 1, regulates the ratio of the speed of the input rotors 10, 11 to the speed of the output rotor 12. As illustrated in full lines rotation of the input rotors 10, 11 at a given speed will cause rotation of the output rotor 12 at a slower speed than said given speed. As indicated in dotted lines, the opposite ratio characteristic can be achieved if the point of contact between the rollers on the input rotors 10, 11 is outside that on the surfaces 12a, 12b of the output rotor 12. If, however, the rollers engage the surfaces 10a, 11a, 12a and 12b at the same radial distance on each such surface from the axis 17 of the shaft 18, the input and output rotors 10, 11, 12 will all rotate at the same speed. This represents a drive ratio of 1:1 between the input and the output of the system.

The input rotor 10 has, on its external periphery, gear teeth 23 engaging with a gear ring 24 on a hollow stepped shaft 25. This hollow stepped shaft is mounted for rotation about an axis 26, parallel with the axis 17. Connecting the hollow stepped shaft 25, with a surrounding sleeve 27, is a clutch 28. The sleeve 27 has gear teeth 29 meshing with a gear (not shown) which drives auxiliary equipment which forms no part of this invention.

The output rotor 12 has external gear teeth 30 and this represents the output of the drive unit.

A coupling is incorporated for driving the transmission system. This includes a member which is shown as a part 75, connected, in use, to apparatus for driving the transmission system, such as an internal combustion engine.

The coupling has a further member which includes two components, a shaft 37 and a coaxial sleeve 39. Surrounding the shaft 37 and sleeve 39 is a hollow sleeve 36 which carries a gear wheel 35. This is in mesh with a gear 34 on the shaft 18. The sleeve 36 is mounted in bearings 79, 80 in the fixed structure 22 of the apparatus. The sleeve 36 is coaxial with the shaft 37 and sleeve 39 which are accommodated within it. The part 75 and one end of the shaft 37 have meshing axially presented teeth at 38.

The driving faces of the teeth, when rotation in one normal direction of rotation is taking place, are slightly undercut at a very small angle to the axis of the parts to assist retention of meshing engagement, or so that there is a force tending during normal rotation, to keep the teeth in engagement.

This hollow shaft 37 has, at one end, an integral flange with axial dog teeth at 38 meshing with dog teeth on a shaft 75 connected, in use, to the driving engine. The shaft 37 also has, at its other end, a straight splined surface 62 and, at its end remote from the teeth 38, the shaft 37 has an annular external groove containing a stop in the form of a circlip 66.

The sleeve 39 has internal straight splines to fit the complementary splines on the shaft 37. The circlip 66 limits relative movement of the sleeve and shaft 37 in one direction.

In effect, the sleeve 39 and shaft 37 do not move relatively axially in normal driving conditions. A washer 76 abuts the end of the sleeve remote from the circlip 66.

At its end at which the sleeve 39 abuts the circlip 66, it has external helical splines 68 engaging corresponding helical splines in the interior surface of the sleeve 36. Formed within this sleeve 36 is a groove containing a stop ring 69 positioned to prevent movement of the sleeve 39 to the right, as shown, during reverse rotation. Two coiled compression springs abut one side of the washer 76 at its opposite face from the sleeve 39. These are concentric and are enclosed between the sleeve 36 and the shaft 37. The larger outer spring 72 abuts against a circlip 71 located in a groove in the interior of the sleeve 36.

The inner lighter spring 31 acts between a ring 67 mounted on a flange of the shaft 37, on which the teeth are formed, and the washer 76. Resting against the end of the sleeve 39 is a flanged cup shaped support ring 73 which supports an element 40.

The element 40 is made of solder in the form of a ring. It will melt at a predetermined temperature. During normal running, in one direction of rotation, the sleeve 39 tends to move relatively to the shaft 37 in a direction away from the the teeth 38 but is restrained from such relative movement by the stop 66. Actual movement of both the components together is prevented by the element 40. The element 40 is however backed by a circlip 78 and washer 77 in the interior of the sleeve 36. Thus axial force which is generated by the helical splines on the sleeve 39 is normally reacted through the element 40 onto the sleeve 36, which, is subject to an equal and opposite force generated by the helical splines and therefore there is no resultant axial force on the bearings 79, 80.

If the element 40 melts, sleeve 39 is caused to move relatively to the sleeve 36 by the helical spline force. When the sleeve 39 abuts the stop 66 further movement of the sleeve 39 causes shaft 37 to move to disengage the teeth 38 from those of the shaft 75, thus preventing damage to the input and to the whole unit resulting from the temperature rise. The spline force is sufficient to overcome the tooth engagement force and this is due to the choice of tooth face angles and helical spline angles.

The spring 72 assists disconnection of the teeth 38 from those on shaft 75, when required, but more importantly it ensures that the teeth cannot re-engage after such disconnection. In such condition the teeth are completely separated and it is important that they should remain so.

Rotation of the member 75 in reverse direction is to be accompanied by ratcheting of the teeth 38. The tooth shape is such as to permit this, in such reverse direction of rotation. Under these conditions, the shaft 37 moves axially against the spring 31, which is provided to return the teeth into engagement as ratcheting takes place. The sleeve 39 does not move and relative axial movement between the shaft 37 and the sleeve 39 is permitted by means of the straight splines 62. The stop 69 prevents any tendency for the sleeve 39 to move in the direction of the teeth during such ratcheting.

FIG. 2 shows a coupling having the same function as that described in relation to FIG. 1 namely to disconnect drive in the event of excessive temperature conditions. The coupling may be used in the same or a different generator drive system. In this apparatus the coupling is positioned in the input of the transmission with a hollow shaft 106 drivingly connected to the associated engine and a gear 104 connected to the transmission main shaft, (shaft 18 in FIG. 1).

The gear 104 is integral with a sleeve 190 and is journalled in bearing 191 in a housing (not shown). The sleeve 190 has internal helical splines 192 which engage complementary splines on a member 193 of cup shaped cross-section. The helix angles of the splines 192 have only a small inclination to the common axes of the sleeve 190 and of the member 193. The helical splines 192 are such that, in the normal direction of rotation of the member 193, there is a tendency of the latter to move to the left, as seen in the drawing. The member 193 has dog teeth which engage, at 194, complementary dog teeth on the input shaft 106. The dog teeth on the member 193 and on the shaft 106 are slightly undercut so that, in the normal direction of rotation of the shaft 106, there is no tendency for the teeth to disengage. The helix angles of the splines 192, and the undercuts on the dog teeth 194 are such that, in the absence of any restraint, the member 193 would move axially to disengage the dog teeth.

The member 193 is mounted on a tube 195 which is slidable within the sleeve 190. A circlip 201 in a groove in the tube serves to restrain any relative movement of the member 193 and the tube 195, in one direction. A washer 196 is secured in a groove in the interior of the sleeve 190 and a compression spring 197 is engaged between the washer 196 and a flange on the end of the tube 195 remote from the circlip 201, to urge the tube to the left. Movement of the member 193 together with the tube 195 to the left is prevented by a tubular spacer 198, a further washer 199 and a fusible spacer element 200, all surrounding the tube 195. The fusible spacer element 200 is engaged between the washer 199 and the member 193. During normal rotation, in either direction, the member 193 remains in close meshing engagement with the shaft 106, as above described, and the helical splines 192 tend to urge the sleeve 190, carrying the gear 104 in a direction to disengage the teeth. This movement is, however, prevented by the element 200. No axial thrust is experienced by a bearing 191 supporting the sleeve 190 or by a further bearing (not shown) which supports the input shaft 106 on associated fixed structure, as a result of axial thrust applied by the splines 192. There are gears 111, 123 mounted for free rotation on the exterior of the sleeve 190 and these are axially located thereon. Rotation of the sleeve 190 is also transmitted to a shaft 105 through splines 202. The gears 111 and 123 as well as the shaft 105 are connected to further parts of the transmission, or other apparatus, and are not important in the present invention.

In the event that temperature within the housing rises above that at which the fusible spacer element 200 melts, the member 193 is moved by the action of the splines 192, overcoming the engaging action of the dog teeth 194, to disengage them. This movement is assisted by the spring 197 though more importantly the spring 197 serves to prevent re-engagement of the teeth once they have been released. The member 193 is carried into abutment with the washer 199. Hydraulic fluid from the transmission is, in use, supplied through a passage in the housing (not shown) to the bore of the shaft 105 so that the temperature of this fluid, which may be indicative of mechanical fault, can act on the fusible spacer element 200 with a minimum of delay. In this form of the coupling, no ratcheting of the teeth can take place.

The coupling may be applied in other forms of apparatus in which similar conditions are applicable.

We claim:

1. A coupling for two coaxial rotary members, axially interengaging teeth on said members arranged for driving engagement between said members, one of said members being connected to a further part rotatable therewith, helical splines by means of which said member and said further part are directly or indirectly connected, the helical splines, during rotation of the members in one direction, applying an axial force between said one member and said further part tending to disengage said teeth, an element sensitive to temperature rise arranged to resist the tendency for axial relative movement between said one member and said further part, said element being arranged to melt when the temperature is in excess of a predetermined value, resulting in said one member being allowed to move axially relatively to said further part under the influence of said force, to disengage the teeth, bearings for rotationally supporting said one member and being substantially free from axial loading due to said force, and spring means to hold the teeth out of engagement after the temperature sensitive element has melted.

2. A coupling as claimed in claim 1 in which the element sensitive to temperature rise is a fusible element made from a material which will melt at the predetermined temperature and will allow said one of the members to move axially relatively to the other, to disengage said teeth.

3. A coupling as claimed in claim 1 in which the helical spline is of shallow angle with respect to the common axis of the members.

4. A coupling as claimed in claim 1 in which said one member is a sleeve having said teeth at one end thereof, a part engaging said sleeve through straight splines and said further part being connected to said part through said helical splines.

5. A coupling as claimed in claim 4 in which said part engages a stop means limiting movement of said part relatively to said further part under the influence of a force created between them through rotation in said one direction.

6. A coupling as claimed in claim 1 in which said one member has said teeth at one end thereof and helical splines thereon engage directly with complementary helical splines on the said further part, which is a sleeve surrounding the said one member.

7. A coupling as claimed in claim 1 in which the teeth have faces, which are normally in driving engagement when rotation in said one direction is taking place, which are undercut normally to provide for positive engagement of said teeth and the helical splines generating a force in excess of the force for positive tooth engagement.

* * * * *